United States Patent
Di Candia et al.

(10) Patent No.: US 9,745,011 B2
(45) Date of Patent: Aug. 29, 2017

(54) ASSEMBLY COMPOSED OF A SADDLE AND A SADDLE COMPARTMENT FOR MOTORCYCLES

(71) Applicant: PIAGGIO & C. S.p.A., Pisa (IT)

(72) Inventors: Antonio Di Candia, Pisa (IT); Alberto Gracci, Pisa (IT)

(73) Assignee: PIAGGIO & C. S.P.A., Pisa (IT)

( * ) Notice: Subject to any disclaimer, the term of this patent is extended or adjusted under 35 U.S.C. 154(b) by 245 days.

(21) Appl. No.: 14/394,137

(22) PCT Filed: Apr. 12, 2013

(86) PCT No.: PCT/EP2013/057661
§ 371 (c)(1),
(2) Date: Oct. 13, 2014

(87) PCT Pub. No.: WO2013/153193
PCT Pub. Date: Oct. 17, 2013

(65) Prior Publication Data
US 2015/0115672 A1    Apr. 30, 2015

(30) Foreign Application Priority Data
Apr. 13, 2012  (IT) .............................. MI20120151 U

(51) Int. Cl.
*B62J 9/00* (2006.01)
*B62J 1/12* (2006.01)
(Continued)

(52) U.S. Cl.
CPC ................. *B62J 9/006* (2013.01); *B62J 1/00* (2013.01); *B62J 1/12* (2013.01); *B62J 1/18* (2013.01); *B62K 19/46* (2013.01)

(58) Field of Classification Search
CPC ...... B60N 2/4686; B60N 2/305; B60N 2/304; B60N 2/3043; B60N 2/3045;
(Continued)

(56) References Cited

U.S. PATENT DOCUMENTS 5,020,173 A * 6/1991 Dreyer, Jr. ........... A47C 19/045
                                                                297/188.1
7,588,111 B2 * 9/2009 Hayashi ................. B62K 19/46
                                                                180/227
(Continued)

FOREIGN PATENT DOCUMENTS

CN     201371881      12/2009
CN     201427620       3/2010
(Continued)

OTHER PUBLICATIONS

English translation of the abstract for CN 201427620 published Mar. 24, 2010.
(Continued)

*Primary Examiner* — David E Allred
(74) *Attorney, Agent, or Firm* — Thomas Horstemeyer, LLP

(57) ABSTRACT

An assembly composed of a saddle (10) and of a saddle compartment (12) for a motorcycle is described. The saddle (10) comprises an upper padded portion which constitutes the seat for the rider and/or passenger of the motorcycle, and a substantially rigid bottom portion (14) operatively connected to the relative saddle compartment (12) by hinge means (16). The saddle compartment (12) is made integral with a fixed portion of the motorcycle. The hinge means (16) enable the saddle (10) to pass from a closed position, in which said saddle (10) is positioned substantially horizontally above the saddle compartment (12) and permits the rider and any passenger of the motorcycle to sit on it, and an open position, in which said saddle (10) is positioned in a
(Continued)

substantially vertical position and permits access to the saddle compartment (12). The assembly comprises at least one gas spring (18) attached to a fixed portion of the motorcycle and operatively connected, at its upper end, to the saddle (10). Between the upper end of the gas spring and the saddle (10) articulated connection means (20, 22) are interposed which permit said saddle (10) to maintain a stable open position.

5 Claims, 4 Drawing Sheets

(51) Int. Cl.
*B62K 19/46* (2006.01)
*B62J 1/00* (2006.01)
*B62J 1/18* (2006.01)

(58) Field of Classification Search
CPC .. B60N 2/3047; B60N 2/3075; B60N 2/3077; B60N 2/3079; B60R 7/043; B60D 11/003; A47C 13/00; A01K 97/22
See application file for complete search history.

(56) References Cited

U.S. PATENT DOCUMENTS

| | | | |
|---|---|---|---|
| 2003/0197393 A1* | 10/2003 | Hanagan | B60N 2/3043 296/65.01 |
| 2004/0104590 A1* | 6/2004 | Kikuchi | B60N 2/01583 296/65.03 |
| 2005/0098596 A1* | 5/2005 | Yano | B62K 19/46 224/413 |
| 2005/0156000 A1* | 7/2005 | Kamemizu | B62H 5/00 224/413 |
| 2005/0200156 A1* | 9/2005 | Michisaka | B62H 5/00 296/97.22 |
| 2008/0156561 A1* | 7/2008 | Yano | B62J 1/12 180/219 |
| 2008/0156562 A1* | 7/2008 | Yano | B62J 1/12 180/219 |
| 2009/0241263 A1* | 10/2009 | DeBraal | A61G 13/0018 5/611 |
| 2011/0073628 A1* | 3/2011 | Inoue | B62J 9/008 224/488 |
| 2016/0009398 A1* | 1/2016 | Klettke | B64D 11/0627 297/183.6 |

FOREIGN PATENT DOCUMENTS

| | | | | |
|---|---|---|---|---|
| EP | 1063155 | | 12/2000 | |
| EP | 1557349 | | 7/2005 | |
| EP | 1772359 | | 4/2007 | |
| EP | 1939077 | | 7/2008 | |
| EP | 1961648 | | 8/2008 | |
| GB | 830467 A | * | 3/1960 | ............. B60T 5/00 |
| JP | EP 0755853 A1 | * | 1/1997 | ............. B62J 1/12 |
| JP | EP 1245481 A1 | * | 10/2002 | ............. B62J 1/12 |
| TW | FR 2820475 A3 | * | 8/2002 | ............. B62J 1/12 |

OTHER PUBLICATIONS

English translation of the abstract for CN 201371881 published Dec. 30, 2009.

* cited by examiner ural stage of the present invention will be more clearly evident from the

ASSEMBLY COMPOSED OF A SADDLE AND A SADDLE COMPARTMENT FOR MOTORCYCLES

CROSS-REFERENCE TO RELATED APPLICATION

This application is the 35 U.S.C. §371 national stage of PCT Application No. PCT/EP2013/057661, filed Apr. 12, 2013, which is herein incorporated by reference in its entirety and which also claims priority to, and the benefit of, Italian Patent Application MI20120000151, filed Apr. 13, 2012, which is herein incorporated by reference in its entirety.

The present invention relates in general to an assembly composed of a saddle and a saddle compartment for motorcycles and, more in particular, to an assisted opening system of the saddle in relation to the relative saddle compartment.

On some types of motorcycle, in particular but not exclusively, mopeds with two or more wheels, it is known of to apply saddles which can be opened to permit access to a saddle compartment. Such saddle compartment is normally utilisable as a compartment for holding helmets and/or a luggage container and may also provide access to some technical and functional components of the motorcycle, such as for example the fuel tank or battery.

The saddle is usually connected to the relative saddle compartment by hinge means which enable it to pass from a closed position, in which the saddle is positioned substantially horizontally above the saddle compartment and permits the rider and any passenger to sit on the motorcycle, and an open position, in which the saddle is positioned in a substantially vertical position and permits access to the saddle compartment. Closing means may then be provided, normally consisting of a lock with key, to prevent the unauthorised opening of the saddle and thus protect the contents of the saddle compartment.

In some embodiments, the hinge means which connect the saddle to the relative saddle compartment act in conjunction with a gas spring which permits a particularly smooth opening of said saddle. The gas spring in addition makes it possible to safely keep the saddle open, and makes such saddle close silently and gently without any noisy impact.

In the embodiments of the known type the gas spring is visibly positioned inside the saddle compartment, thereby subtracting a part of the useful space available in such saddle compartment. Such visible arrangement of the gas spring may in addition prove inconvenient to the user, who may accidentally interfere with the proper functioning thereof.

The general purpose of the present invention is therefore to make an assembly composed of a saddle and of a saddle compartment for motorcycles which is able to resolve the drawbacks of the prior art mentioned above in an extremely simple, economical and particularly functional manner.

In detail, it is a purpose of the present invention to make an assembly composed of a saddle and of a saddle compartment for motorcycles which makes it possible to fully use the space available in said saddle compartment.

Another purpose of the invention is to make an assembly composed of a saddle and of a saddle compartment for motorcycles which is able to guarantee greater stability of the saddle in its open position.

A further purpose of the invention is to make an assembly composed of a saddle and of a saddle compartment for motorcycles in which the gas spring is present but not visible by the user.

These purposes of the present invention are achieved by making an assembly composed of a saddle and a saddle compartment for motorcycles as described in claim 1.

Further characteristics of the invention can be seen from the dependent claims, which form an integral part of this description.

The characteristics and advantages of an assembly composed of a saddle and of a saddle compartment according to the present invention will be more clearly evident from the description below, made by way of a non-limiting example with reference to the appended drawings, wherein.

Figure 1:
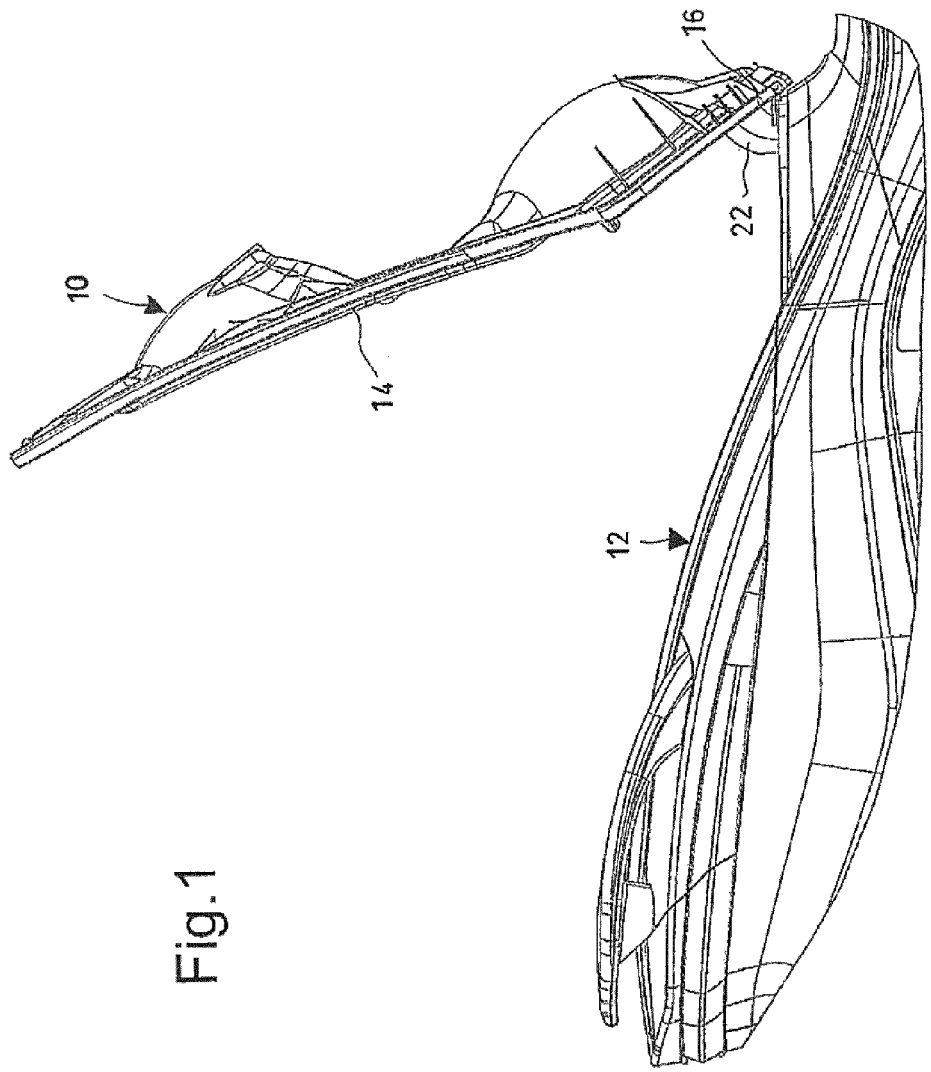
FIG. 1 is a side elevation view of the assembly composed of a saddle and of a saddle compartment according to the invention, in which the saddle is shown in the open position.

With reference to the figures, a preferred embodiment of the assembly composed of a saddle and of a saddle compartment for motorcycles according to the invention is shown. The saddle and relative saddle compartment are respectively denoted by reference numerals 10 and 12.

The saddle 10 comprises, in a manner in itself known, an upper padded portion (not shown), which constitutes the seat for the rider and/or passenger of the motorcycle, and a substantially rigid bottom portion 14 operatively connected to the relative saddle compartment 12 by hinge means 16. In turn the saddle compartment 12 is made integral with a fixed portion (frame or chassis) of the motorcycle by attachment means of the known type.

The hinge means 16 enable the saddle 10 to pass from a closed position, in which the saddle 10 is positioned substantially horizontally above the saddle compartment 12 and permits the rider and any passenger of the motorcycle to sit on it, and an open position, obviously obtained when the motorcycle is at a standstill, in which said saddle 10 is positioned in a substantially vertical position and permits access to the saddle compartment 12. Closing means (not shown) may then be provided to prevent the unauthorised opening of the saddle 10 and thus protect the contents of the saddle compartment 12. For example, such closing means may consist of a lock with key.

Figure 3:
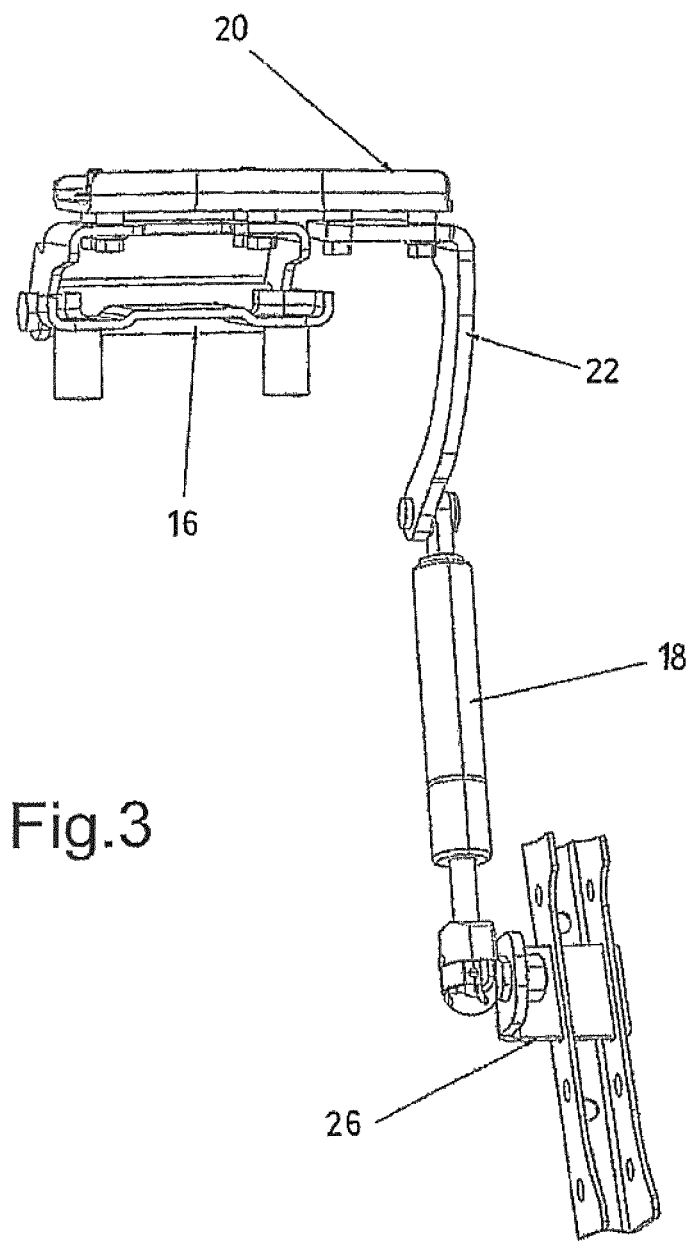
FIG. 3 is a detailed view of the components carrying out the opening and closing of the saddle.

The saddle 10 is of the type with an assisted opening system and at least one gas spring 18 is thus provided positioned between the saddle 10 and relative saddle compartment 12. More specifically, according to the embodiment shown in the figures, the gas spring 18 is attached at the bottom to a fixed portion of the motorcycle and is operatively connected, at its upper end, to the saddle 10 by means of interposed articulated connection means which permit said saddle 10 to maintain a stable open position. As shown in FIG. 3, the gas spring 18 may be attached to a fixed portion of the motor cycle by means of an interposed shaped coupling element 26.

Figure 2:
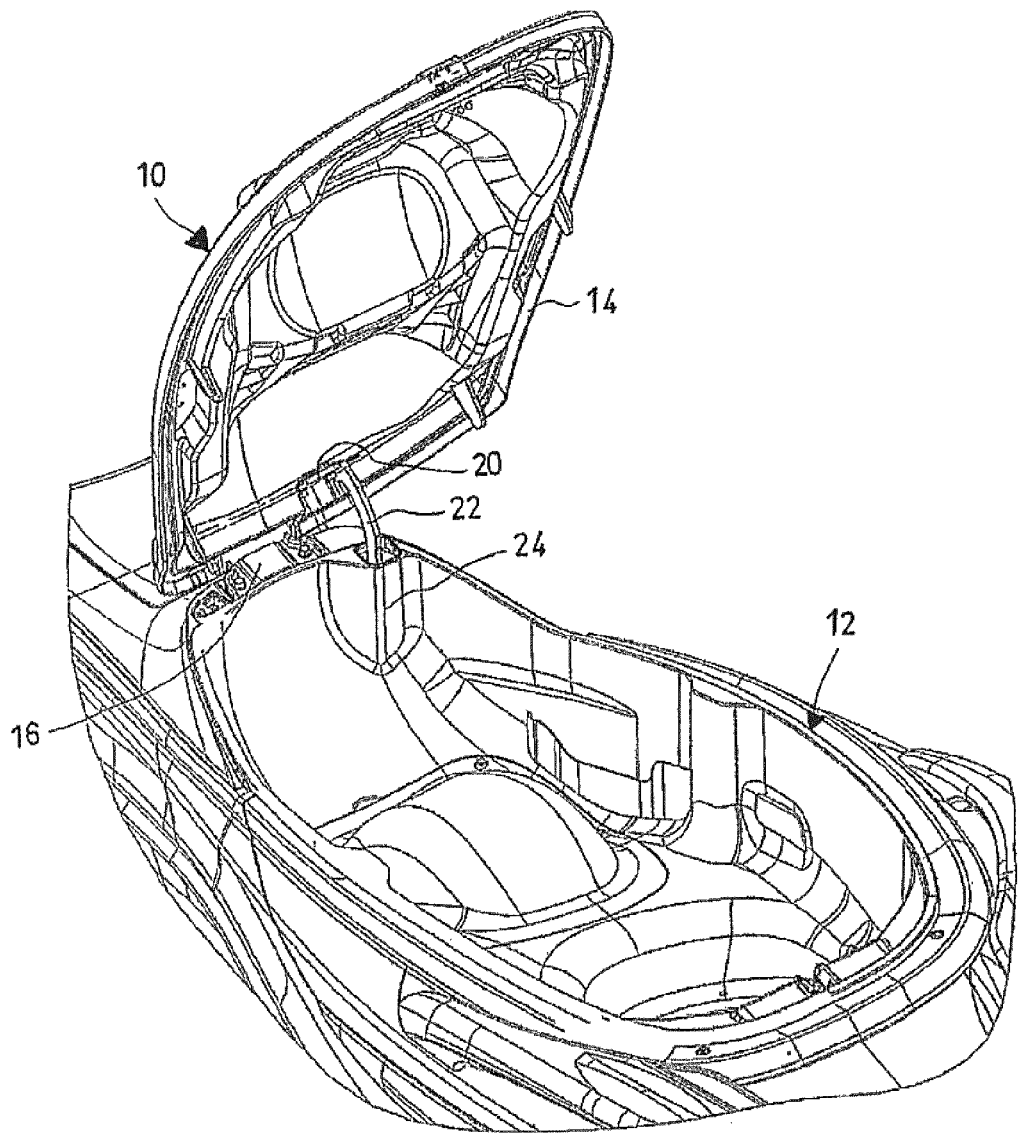
FIG. 2 is a perspective view of the assembly composed of a saddle and of a saddle compartment according to the invention, in which the saddle is shown in the open position.
Figure 4:
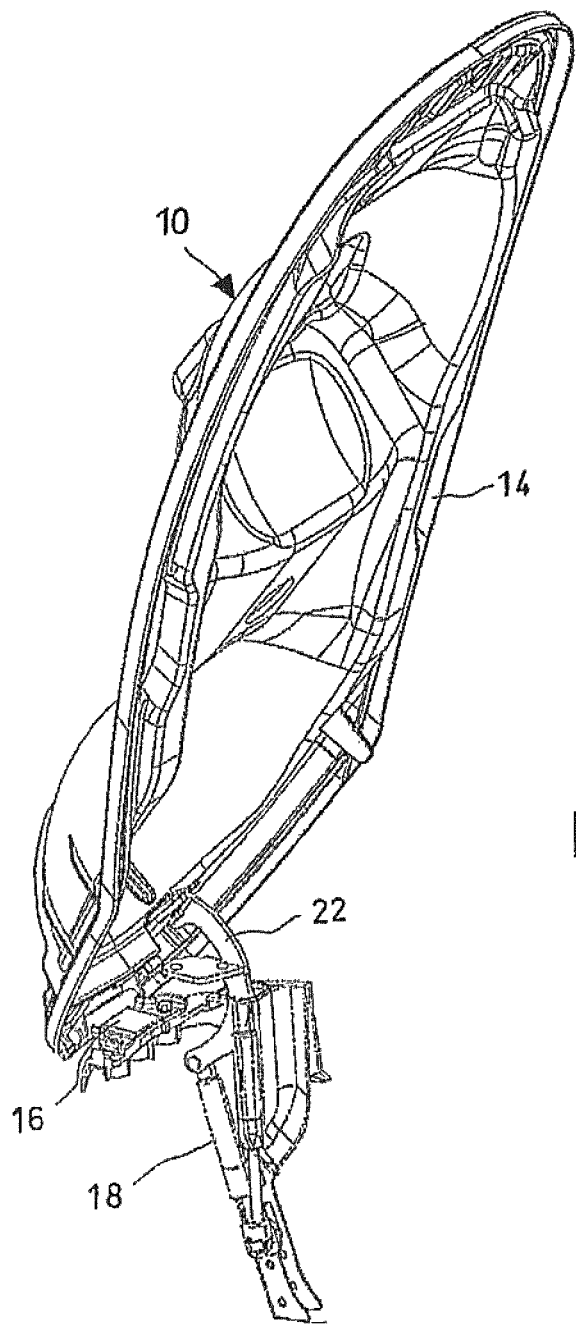
FIG. 4 is another perspective view of the assembly composed of a saddle and of a saddle compartment according to the invention, in which the components carrying out the opening and closing of the saddle are shown.

In detail, the aforementioned articulated connection means comprise a plate 20, attached to the saddle 10 and to the hinge means 16, and a curved arm 22, fixed at the top to such plate 20 and at the bottom hinged to the upper end of the gas spring 18. The curvature radius of the curved arm 22 is calculated so as to firmly maintain the saddle 10 in the open position shown in FIGS. 1, 2 and 4.

The gas spring 18 is guided, in its extension and contraction movements corresponding respectively to the opening and closing movements of the saddle 10 in relation to the respective saddle compartment 12, inside a casing 24 made in the side wall of such saddle compartment 12. This way the gas spring 18 always remains hidden during the opening of the saddle 10 and the user sees only the curved arm 22 which, directly attached to the plate 20 in turn attached to the saddle 10 and to the hinge means 16, makes the saddle 10 more stable in its open position. The casing 24 may be made in one piece with the side wall of the saddle compartment 12, or may be attached to such side wall of the saddle compartment 12 by means of generic attachment means, reversible or otherwise.

It has thus been seen that the assembly composed of a saddle and of a saddle compartment for motorcycles according to the invention achieves the purposes specified earlier.

The assembly composed of a saddle and of a saddle compartment for motorcycles thus conceived, is in any case susceptible to numerous modifications and variations, all falling within the same inventive concept; moreover, all the parts may be replaced with technically equivalent elements. In practice, the materials used, as indeed the shapes and dimensions may be varied as needed according to technical requirements.

The sphere of the invention is thus defined by the appended claims.

The invention claimed is:

1. An assembly composed of a saddle and of a saddle compartment for a motorcycle, wherein the saddle comprises a padded upper portion, which constitutes a seat for a rider and/or passenger of the motorcycle, and a substantially rigid bottom portion, operatively connected to the saddle compartment by hinge means, and wherein the saddle compartment comprises a sidewall having laterally inwardly facing surfaces forming a recess for storing objects below the saddle, wherein the saddle compartment is made integral with a fixed portion of the motorcycle, said hinge means enabling the saddle to pass from a closed position, in which said saddle is positioned substantially horizontally above the saddle compartment and permits the rider and any passenger of the motorcycle to sit on it, and an open position, in which said saddle is positioned in a substantially vertical position and permits access to the saddle compartment, the assembly comprising at least one gas spring having a bottom end and an upper end, wherein the bottom end of the gas spring is attached to a fixed portion of the motorcycle and the upper end of the gas spring is operatively connected, to the saddle, wherein between the upper end of the gas spring and the saddle, articulated connection means are interposed which permit said saddle to maintain stability in the open position, wherein the saddle compartment further comprises a casing that is one piece with at least one side wall of the compartment, the casing forming a protrusion that protrudes inwardly into the compartment; and wherein the gas spring is guided, inside the casing during extension and contraction movements of the gas spring corresponding respectively to opening and closing movements of the saddle in relation to the saddle compartment so that the gas spring always remains hidden relative to an interior of the compartment while the saddle is in transition to and in the open position; and wherein the casing comprises an open side that opens laterally outwardly away from the compartment, and wherein the gas spring moves in and out of the casing through the open side during opening and closing of the saddle, respectively.

2. The assembly according to claim 1, characterised in that the casing is made in one piece with the side wall of the saddle compartment.

3. The assembly according to claim 1, characterised in that the gas spring is attached to a fixed portion of the motorcycle by means of an interposed shaped coupling element.

4. The assembly according to claim 1, further comprising closing means to prevent an unauthorized opening of the saddle and thus protect contents of the saddle compartment.

5. The assembly according to claim 1, wherein the articulated connection means comprise a plate, attached to the saddle, and a curved arm having a top end and a bottom end, the top end of the curved arm is fixed to said plate and the bottom end of the curved arm is hinged to the upper end of the gas spring, a curvature radius of the curved arm being calculated so as to firmly maintain the saddle in the open position;

characterised in that:
  said plate is attached to the hinge means; and
  said bottom end of the curved arm is hinged to the upper end of the gas spring.

* * * * *